Sept. 5, 1933.  P. DE MATTIA  1,925,995
TIRE VULCANIZING APPARATUS
Filed April 14, 1931     4 Sheets-Sheet 1

INVENTOR
PETER DE MATTIA
BY
Ely & Barrow
ATTORNEYS

Sept. 5, 1933.    P. DE MATTIA    1,925,995
TIRE VULCANIZING APPARATUS
Filed April 14, 1931    4 Sheets-Sheet 2

INVENTOR
PETER DE MATTIA
BY
ATTORNEYS

Sept. 5, 1933.  P. DE MATTIA  1,925,995

TIRE VULCANIZING APPARATUS

Filed April 14, 1931  4 Sheets-Sheet 3

INVENTOR
PETER DE MATTIA
BY
Ely & Barrow
ATTORNEYS

Sept. 5, 1933.  P. DE MATTIA  1,925,995
TIRE VULCANIZING APPARATUS
Filed April 14, 1931  4 Sheets-Sheet 4

INVENTOR
PETER DE MATTIA
BY Ely & Barrow
ATTORNEYS

Patented Sept. 5, 1933

1,925,995

UNITED STATES PATENT OFFICE 1,925,995

TIRE VULCANIZING APPARATUS

Peter De Mattia, Passaic, N. J., assignor to National Rubber Machinery Company, Akron, Ohio, a corporation of Ohio Application April 14, 1931. Serial No. 530,017

15 Claims. (Cl. 18—17)

This invention relates to tire vulcanizing apparatus of the unit or "watchcase" type.

The invention is of primary utility used with unit type vulcanizers for large size pneumatic tire casings wherein much difficulty heretofore has been experienced in removing the tires from the vulcanizers, by reason of the large surface area of the tires and the sticking of said surface to the mold cavity.

The chief objects of the invention are to save time and labor in the vulcanizing of large pneumatic tire casings; automatically to effect stripping of the tire from the mold cavity concurrently with the opening of the mold; and to provide simple and efficient apparatus for attaining the foregoing objects.

Briefly stated, the invention consists of apparatus for effecting relative movement of a tire with relation to both mold members of a tire-vulcanizing apparatus, automatically and concurrently with the opening of the apparatus at the conclusion of a tire-vulcanizing operation.

Of the accompanying drawings.

Figure 1:
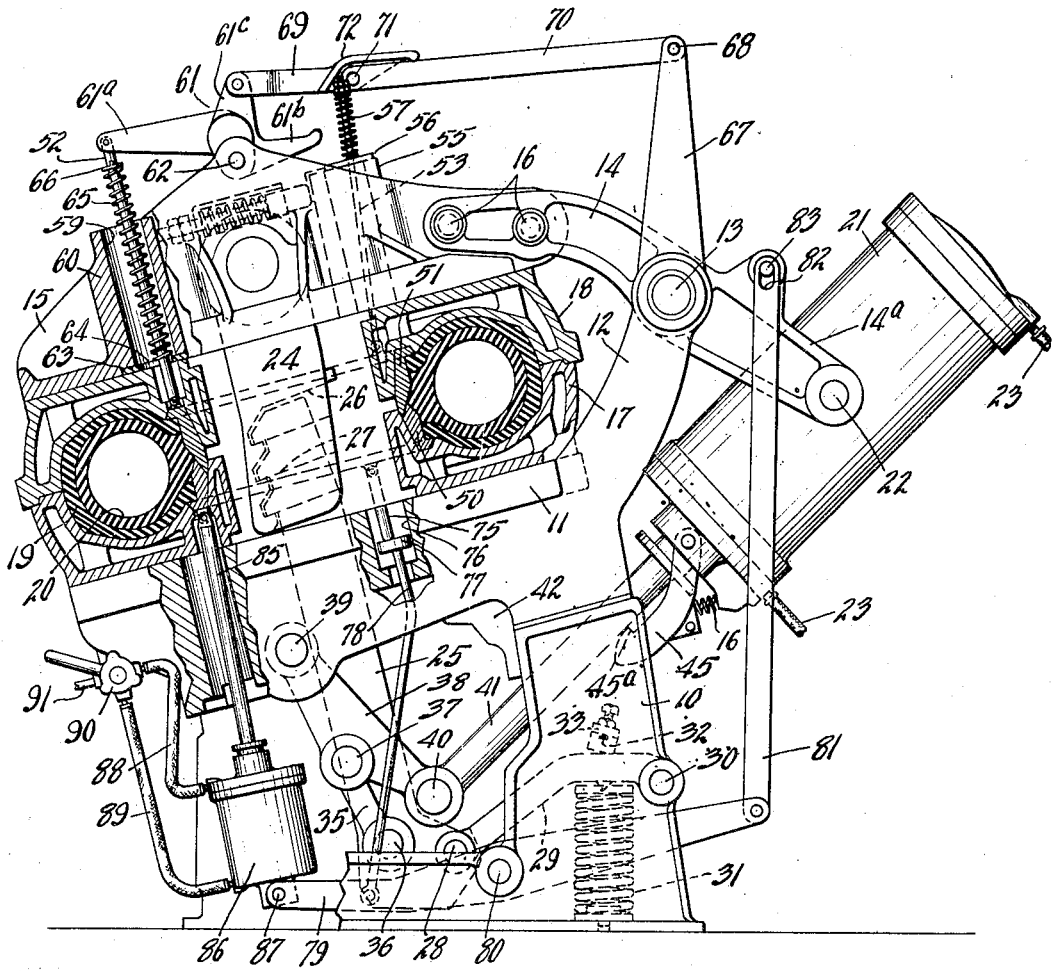
Figure 1 is a side elevation of a closed tire-vulcanizing press embodying the invention in its preferred form, and a tire therein, the tire and a part of the press being in section.

Referring to the drawings, 10 is a suitable base or frame, and 11 is a stationary lower platen formed on the top thereof, said platen preferably being downwardly inclined toward the front of the press (the left side thereof as viewed in the drawings). Rising from the frame 10 at the rear thereof is a pair of spaced-apart arms or brackets 12, 12, and pivotally mounted upon a hinge pin 13 mounted in the free ends of said brackets are respective lever-arms 14, 14. Between them the lever arms 14 support an upper movable platen 15 that is secured to the forward ends of said arms by bolts 16, 16.

Mounted upon the adjacent faces of the lower and upper platens 11, 15 are respective jacketed, annular, mating mold sections 17, 18, said mold sections being secured to the platens by any suitable means such as bolts (not shown) and suitable connections (not shown) are provided for supplying heated fluid to the jackets of the molds.

The work, which consists of pneumatic tire casing 19, is shown within the mold and in the various stages of removal therefrom. The usual expansible core 20 is shown within the tire, and the usual fluid conductor (not shown) is provided for supplying heated fluid under pressure to the core during the tire-vulcanizing period.

The apparatus is constructed and arranged to be opened and closed and locked by a single double-acting fluid pressure cylinder 21 that is centrally formed on its opposite sides with trunnions 22, 22, the latter being pivotally mounted in the ends of respective rearward extensions 14$^a$ of the lever-arms 14. The cylinder 21 is provided at its respective ends with flexible fluid inlet and outlet connections 23, 23.

Mechanism for locking the upper and lower platens 15, 11 against relative movement when the mold sections 17, 18 are in closed, mating relation comprises a locking block 24 adjustably and rigidly secured to the upper platen 15, and a movable locking post 25 associated with the frame 10. The locking block 24 projects downwardly from the upper platen 15, substantially at the axis thereof, and in the lowered position of the upper platen it extends through the lower mold 17 in position to be engaged by the locking post 25. One side of the locking block 24 is arcuately recessed as shown at 26 in broken lines in Figure 1, and formed with a series of ledges adapted to interfit with complementally shaped arcuate flanges 27, 27 formed on the adjacent end of the locking post 25.

The locking post 25 is pivotally mounted at 28 at its lower end upon the free end of an arm 29, the latter being pivotally mounted at its other end at 30 upon the frame 10. Normally the arm 29 is yieldingly urged upwardly by a compression spring 31 mounted beneath it, and upward movement of the arm is determinately limited by an adjustable stop 32 threaded through a bracket 33 that is supported by the frame 10, above the arm 29.

For manipulating the locking post 25 to cause it to engage and disengage the locking block 24, a link 35 is pivotally connected at 36 to the lower end of the locking post, laterally of the pivot 28. The other end of the link 35 is pivotally connected at 37 to the middle of a lever-arm 38 that is pivotally mounted at one end at 39 on the frame 10, and has its other end pivotally connected at 40 to the outer end of the piston rod 41 of the fluid pressure cylinder 21. The construction and arrangement of the link 35 and lever-arm 38 is such that they constitute a toggle between the locking post 25 and the cylinder 21, whereby the latter is adapted to effect vertical and lateral movement of the locking post, in succession, in the operations of opening and closing the apparatus. Lateral movement of the locking post is limited by a lug 42 formed on the frame 10, which lug is engaged by a projecting end portion of the pivot-pin 40 at the time the locking post 25 is fully disengaged from the locking block 24.

The arrangement of the parts described in the foregoing paragraph is such that in the operation of opening the apparatus the pivot-pin 40 engages the lug 42 before the piston rod 41 of the cylinder 21 is fully retracted into the cylinder, so that in the continuation of the movement of the piston rod into the cylinder the latter moves forwardly along the piston rod. This movement of the cylinder 21 causes such angular movement of the lever-arms 14 as to move the upper platen 15 and mold section 18 to the elevated positions shown in Figure 3.

As a safety measure to prevent lowering of the platen 15 from leakage or failure of the pressure fluid in the front end of the cylinder 21, a latch 45 is pivotally suspended from the front end of the cylinder 21 and backed by a compression-spring 46. The free end of the latch 45 is formed with a pointed nose 45ª adapted automatically to enter a recess 47 (Figure 3) formed in the adjacent end portion of the lever-arm 38 on the under side thereof, whenever the piston rod 41 is fully retracted within the cylinder 21, as is clearly shown in Figures 3 and 4. The arrangement is such as positively to prevent accidental lowering of the upper platen. Means (not shown) is provided for manually disengaging the latch 45 from the lever-arm 38 before fluid can be admitted to the rear end of the cylinder 21.

Mounted in suitable channels within the mold sections 17, 18 and constituting a part of the tire-molding structure are respective bead molding rings 50, 51, and means is provided for effecting such relative movement of the bead rings and the mold sections as to strip the tire from the latter upon the opening of the apparatus. The lower bead ring 50 also serves as a support for an unvulcanized tire when the latter is placed in the mold, to hold the tire out of contact with the hot lower mold section until the upper mold section is lowered, with the result that uniformity of cure on opposite sides of the tire is effected.

Figure 2:
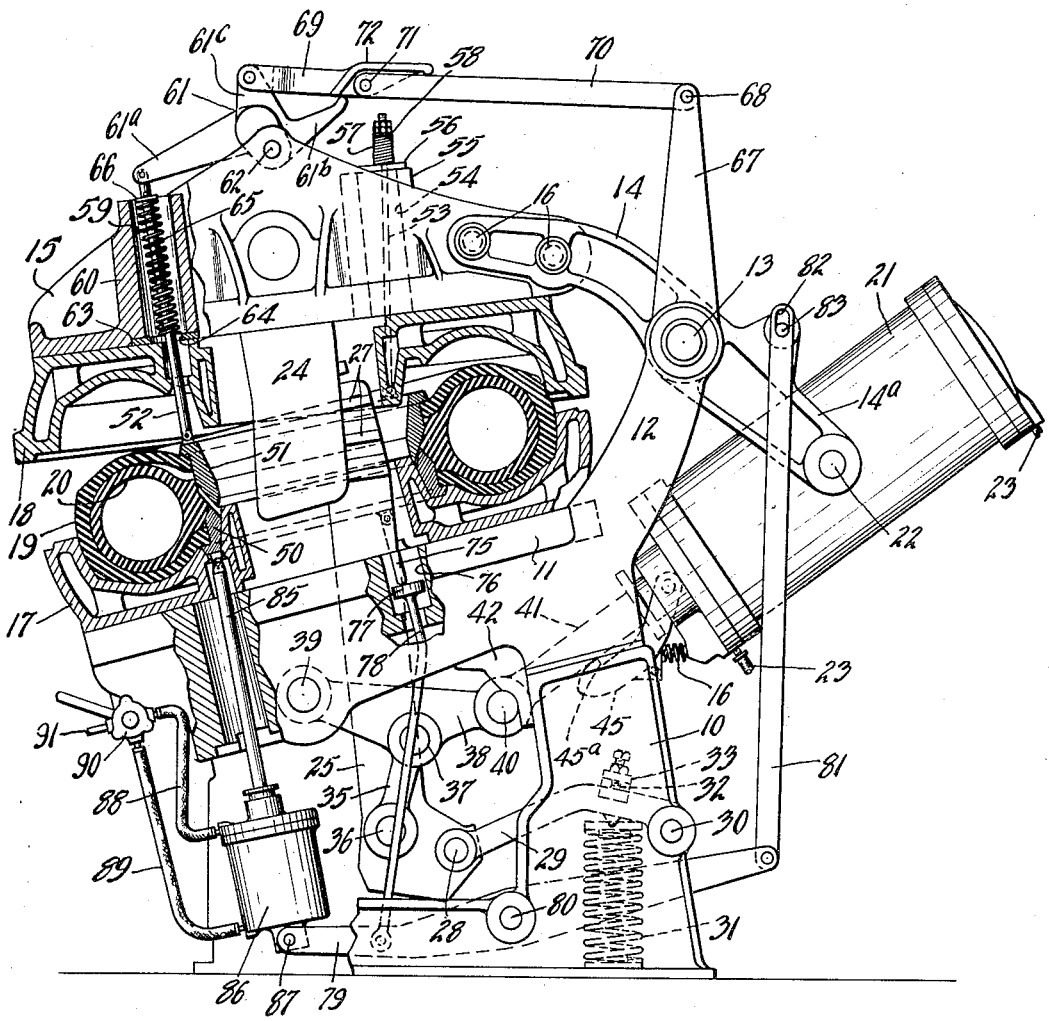
Figure 2 is a view similar to Figure 1 showing the position of the parts during the initial movement of the opening of the press.

The upper bead ring 51 is adapted to remain in engagement with the tire 19 and to hold down the tire as the upper mold section 18 is raised, as is most clearly shown in Figure 2, with the result that the tire is "stripped" or disengaged from the said upper mold section. Automatically operating mechanism is provided for so holding the upper bead ring, and for retracting the same into its channel or seat before the lower bead ring 50 is lifted to strip the tire from the lower mold section.

For manipulating the upper bead ring as described, rods 52, 53, 53 have their respective lower ends pivotally connected to the ring at suitable points, the rod 52 being positioned at the front and the rods 53 near the rear of the ring. The rods 53 extend upwardly through respective axial bores 54 in annular bosses 55, 55 formed on the upper platen 15, and through suitable apertures formed in cover plates 56, 56 mounted upon the tops of said bosses. Compression springs 57 are mounted upon the respective rods 53 between the cover plates 56 and washers 58 which are held on the rods by nuts or other suitable means.

The front rod 52 extends upwardly through an axial bore 59 formed in an annular boss 60 on the platen 15, and has its upper end connected to one arm 61ª of a three-arm lever 61 that is pivotally mounted at 62 in the top of the platen 15. In the bottom of the bore 59 is a plate 63 that is formed with a slot 64 through which the rod 52 extends, and said plate forms a lower support for a compression spring 65 that is mounted on the rod and has its upper end bearing against a washer or collar 66 mounted upon the rod near its upper end. The arrangement is such that the bead ring 51 normally is yieldingly held in its channel or seat by the rods 52, 53 and springs 57, 65.

Rising upwardly in continuation of the respective arms or brackets 12 are arms 67, 67, the upper ends of which are connected by a cross-rod 68. The latter constitutes a fixed point upon which is pivotally mounted one end of a toggle comprising members 69, 70, the other end of the toggle being pivotally connected to an arm 61ᶜ formed on the lever 61 and extending upwardly therefrom. The toggle members 69, 70 are pivotally connected to each other at 71, and member 69 is formed with a laterally extending flange 72 that overlies the member 70 in such a manner as to limit the hinging action of the toggle in one direction. In the closed position of the vulcanizer the pivot 71 is slightly below center with relation to the pivotal connections at the respective ends of the toggle. The lever 61 also is formed with a rearwardly extending arm 61ᵇ, the free end of which underlies the flange 72 of the toggle, and is adapted to engage the latter, upon occasion, as subsequently will be described.

For manipulating the lower bead ring 50 to strip the tire 19 from the lower mold section 17, the ring 50 is provided at two points near the rear thereof with respective pivotally-connected depending rods, such as the rod 75, and the latter extends into a recess 76 in the frame 10 in which is slidably mounted a head 77 formed on the upper end of a push rod 78. The latter extends through a suitable aperture at the bottom of the recess 76 and has its lower end connected to the forward end portion of a rocker arm 79 that is journaled on a shaft 80 mounted in the frame 10 near the bottom thereof. Although but one rocker arm 79 is shown, it will be understood that there are two of them, located on opposite sides of the machine, and that there are two push rods 78, the latter being connected to respective rocker arms 79. The rocker arms 79 are rocked in timed relation to the raising of the upper platen 15 by means of links 81, 81 that connect the rear ends of the respective rocker arms to the portions 14ª of the lever-arms 14, the end portion of each link being formed with a slot 82 in which moves a stud 83 that projects laterally from the member 14ª. The arrangement provides such lost motion between the lever-arms 14 and the links 81 that substantial angular movement of the arms 14, sufficient to lift the upper platen an appreciable distance as is shown in Figure 2, is effected before the links start to move the rocker arms 79.

Pivotally connected to the ring 50 at the front thereof, and extending downwardly through suitable recesses in the mold section 17 and frame 10, is a piston rod 85 of a double-acting fluid pressure cylinder 86 that is pivotally supported on a rod or shaft 87 that connects and is supported by the front ends of the rocker arms 79. The cylinder 86 is provided at its respective ends with flexible fluid inlet-and-outlet pipes 88, 89 that extend to a manually operated control valve 90, fluid being supplied to the latter through pipe 91 from a source of pressure fluid (not shown). The cylinder 86 and piston rod 85 constitute supplemental means for raising the bead ring 50, so that the front thereof may be elevated higher than is possible by use of the rocker arm 79 alone.

As hereinbefore stated, the invention is primarily useful in removing vulcanized tires from molds, so that the operation of the apparatus will be described particularly with reference to this feature of the invention. The apparatus and the vulcanized tire therein are shown in Figure 1, the various elements of the apparatus being shown in normal vulcanizing position.

To open the apparatus, pressure fluid is admitted to the front end of the cylinder 21 to retract the piston rod 41 thereof, and thereby to flex the toggle comprising link 35 and lever arm 38 so as to manipulate the locking post 25, with the result that the latter is pushed upwardly against the locking block 24 and "cracks" or effects initial separation of the mold sections 17, 18, and then moves laterally so as to disengage itself from the locking block. Movement of the toggle and locking post ceases when the pivot pin 40 engages the lug 42 and in further relative movement of the cylinder 21 and its piston rod 41 the cylinder moves forward along the piston rod. This causes the lever-arms 14 to move angularly about their pivots 13 to lift the upper platen 15 and the upper mold section 18 as is most clearly shown in Figure 2.

During this movement of the platen and mold section, the toggle consisting of members 69, 70 swings about the pivot 68, but because of the positions of the pivots 13 and 68 with relation to the lever 61 and its pivot 62, the pivot 62 and the end of the toggle describe arcs which diverge, with the result that the lever 61 is so moved angularly about its pivot 62 as to move the lever arm 61ᵃ and rod 52 downwardly with relation to the upper platen. However, since the platen 15 is rising substantially at the same rate that the rod 52 is moving downwardly, the net result is to hold the upper bead ring 51 substantially stationary against the tire while the mold section 18 moves away from the tire, thus freeing the latter entirely from the said mold section. During the foregoing operation the springs 57 and 65 are compressed, but the springs 57 do not pull the rear of the bead ring from the tire because of the adhesion of the bead ring to the tire, the close fit therewith that resists tilting of the ring with relation to the tire, and the fact that there is less relative movement between the mold section and bead ring at the rear of the latter than at the front due to the shorter radius of movement of the mold at the rear thereof.

The angular movement of the lever 61 just described causes the arm 61ᵇ thereof to move in an arc toward the toggle member 69, and to engage the flange 72 thereof as shown in Figure 2. Thus at a determinate angular position of the platen 15, the arm 61ᵇ engages and raises the member 69 and moves the pivot point 71 past center with relation to the pivot 68 and the pivotal connection of the member 69 to the lever 61, with the result that the compressed spring 65 is permitted to expand and thereby to move the rod 52 upwardly and withdraw the bead ring 51 from the tire and return it to its seat in the mold section 18, the springs 57 also assisting in so moving the bead ring. The upward movement of the rod 52 tilts the lever 61 and toggle members 69, 70 substantially to the positions shown in Figure 3, which figure shows the upper platen 15 in its uppermost position and the safety latch 45 engaged in the recess 47.

Because of the lost motion of the stud 83 in the slot 82 of the link 81, the upper platen 15 moves slightly beyond the position shown in Figure 2 before there is any movement of the rocker arms 79 so that the upper bead ring is retracted into its channel before the lower bead ring starts to rise. As the lever-arms 14 move angularly and raise the upper platen to the uppermost position shown in Figure 3, the downwardly urged link 81 raises the forward end portion of the rocker arms 79, and the latter, by lifting the push rods 78 and cylinder 86, raise the lower bead ring 50 to the position shown in Figure 3, the tire 19 being thereby stripped from the lower mold section 17 and elevated to the position shown in said figure. The operator then operates the valve 90 to admit pressure fluid to the bottom of the cylinder 86, whereby its piston rod 85 is projected upwardly to lift the front of this bead ring and the tire to the extreme elevated position shown in Figure 4. This assures that the tire will completely strip from the lower mold section, and provides sufficient clearance between said mold section and the tire, at the front thereof, to permit the insertion of a support or spacing member such as the piece of wood 95. The cylinder 86 is then reversed to draw the bead ring 50 away from the tire, leaving the latter in position easily to be engaged by any suitable tool or mechanism for removing it from the apparatus.

Figure 3:
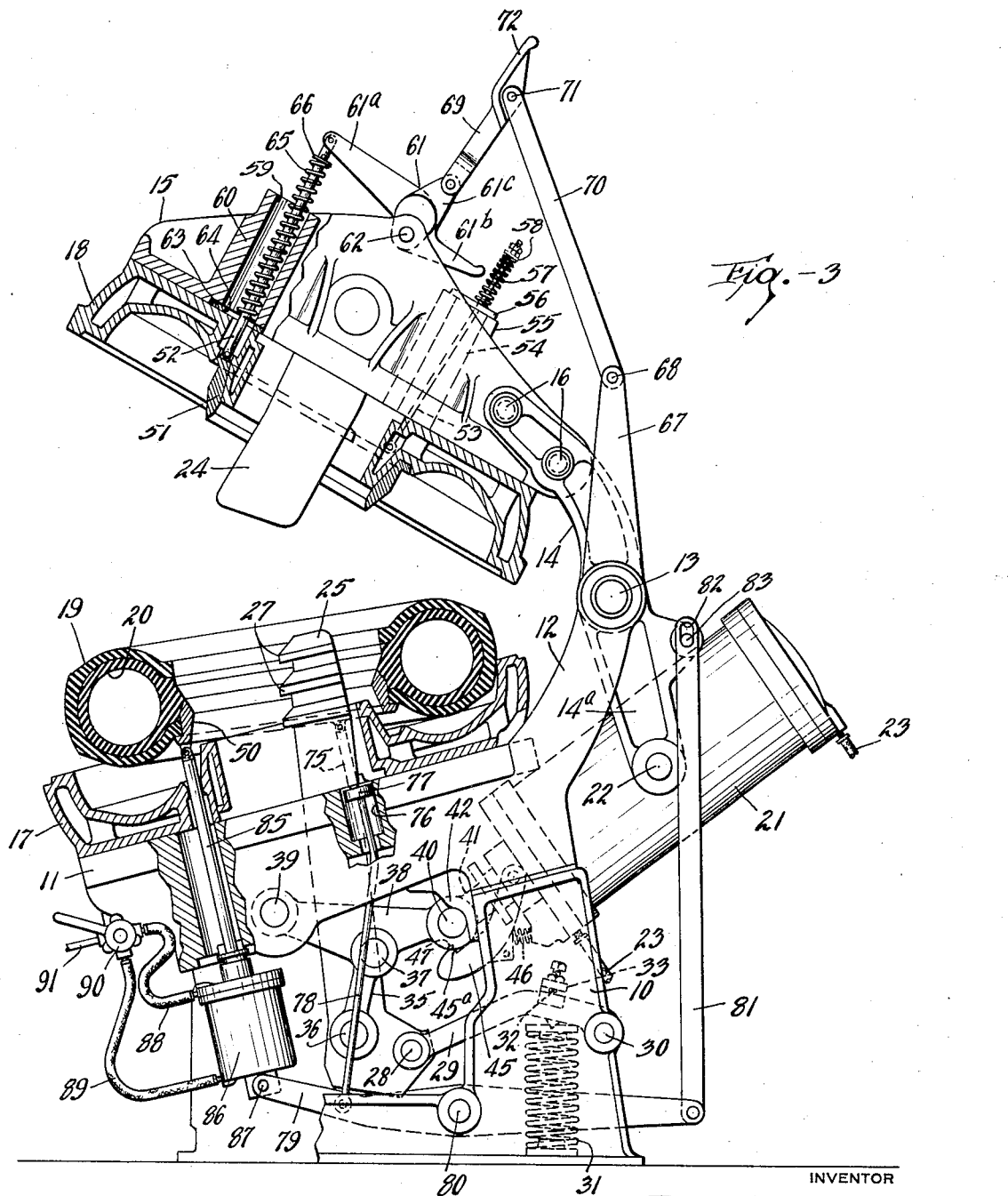
Figure 3 is a view similar to Figures 1 and 2 showing the press fully opened.
Figure 5:
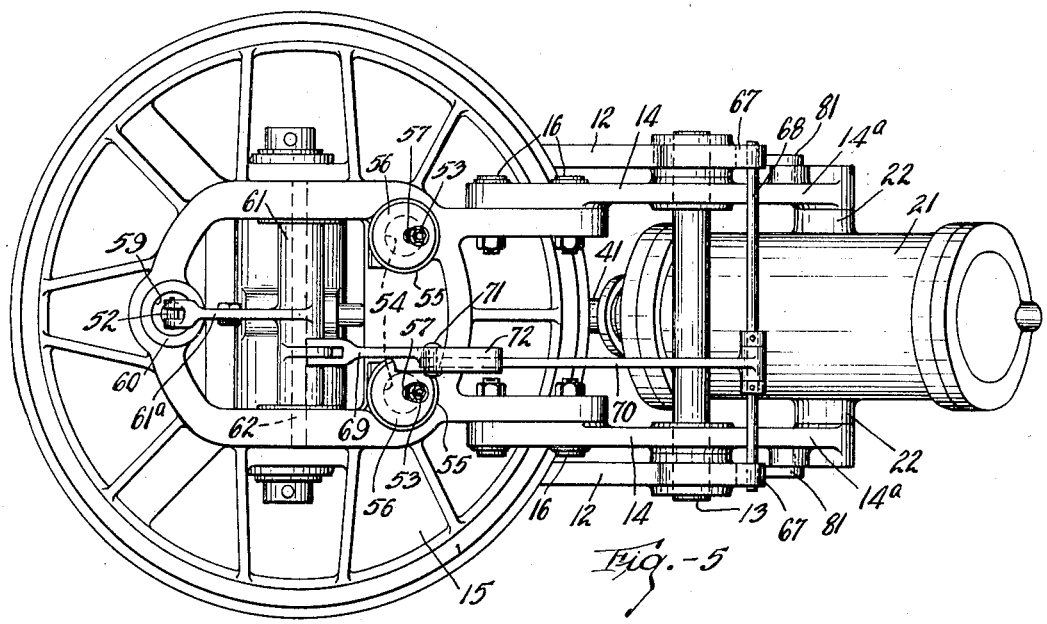
Figure 5 is a plan view of the apparatus shown in Figure 1 viewed parallel to the axis of the tire therein.
Figure 4:
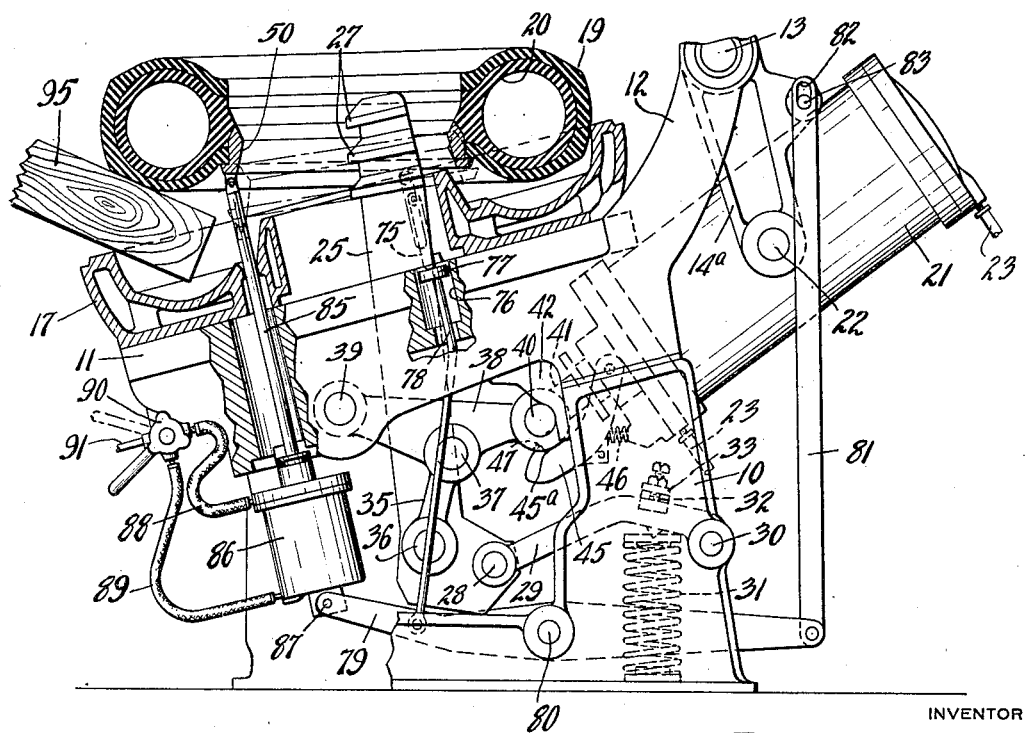
Figure 4 is a fragmentary view of part of the apparatus shown in the foregoing figures, showing the final step of separating a tire from a tire mold.

An unvulcanized tire may then be mounted in the apparatus, the tire seating upon the lower bead ring 50 which is in the position shown in Figure 3, and thereby being held out of contact with the hot lower mold section. The latch 45 is then released and pressure fluid admitted to the rear end of the cylinder 21 while the front end thereof is exhausted. This causes the upper platen 15 to move downwardly to confine the tire between the mold halves, and concurrently permits the bead ring 50 to move downwardly by gravity and the weight of the tire to seat the latter in the lower mold section. After the tire is vulcanized, which completes one cycle of operations, the steps described are repeated.

The apparatus may be variously modified within the scope of the appended claims which are not limited wholly to the specific construction shown and described.

What is claimed is:—

1. In tire vulcanizing apparatus, the combination of a pair of mating, relatively movable mold sections, bead rings seated in respective mold sections, positive means comprising a toggle for moving at least one of said bead rings from its seat as the mold is opened, and yielding means for restoring the ring to its seat after the mold has opened a determinate distance.

2. A combination as defined in claim 1 in which the mold sections are hinged for relative angular movement, and the bead ring is restored to its seat after determinate angular movement of one of the sections.

3. In tire vulcanizing apparatus, the combination of a pair of mating, relatively movable mold sections, bead rings seated in respective sections, means comprising a toggle for moving one of said bead rings from its seat as the mold is opened, and means for flexing the toggle after the mold has opened a determinate distance to permit the bead ring to be restored to its seat.

4. A combination as defined in claim 3 including yielding means for restoring the bead ring to its seat after the toggle is flexed.

5. In tire vulcanizing apparatus, the combination of a pair of mating, relatively movable mold sections, bead rings seated in respective sections, a push rod connected to the ring in a movable section, a lever connected to said push rod, and an over-center toggle so connected to a fixed point and to said lever as to cause the latter to move the push rod and unseat the bead ring as the mold sections are separated.

6. A combination as defined in claim 5 including a spring on the push rod adapted to be compressed by the ring-unseating movement of the push rod.

7. A combination as defined in claim 5 including means for moving the toggle-hinge past center when the mold sections have moved a determinate distance.

8. In tire vulcanizing apparatus, the combination of a pair of mating, relatively movable mold sections, bead rings seated in respective sections, a push rod connected to the ring in a movable section, a lever connected to said push rod, an over-center toggle so connected to a fixed point and to said lever as to cause the latter to move the push rod to unseat the bead ring as the mold sections are separated, and means on the lever for moving the toggle hinge past center to permit reseating of the bead ring when the mold sections are open a determinate distance.

9. In apparatus of the character described the combination of a pair of mating mold sections hinged together for relative movement, bead rings seated in the respective mold sections, a push rod connected to one of the bead rings, a spring so mounted on said push rod as to be compressed upon the unseating of the bead ring, a lever connected to said rod, an over-center toggle so connected to said lever as to cause the latter to move the push rod to unseat the bead ring concurrently with the opening of the mold, and means on the lever for moving the toggle past center to effect reseating of the bead ring when the mold sections are opened angularly a determinate distance.

10. In apparatus of the character described, the combination of a pair of mating, relatively movable mold sections, bead rings seated in the respective sections, push rods connected to one of said bead rings, means including a lever for operating the push rods in timed relation to relative movement of the mold sections to move the bead ring a determinate distance out of its seat, and means supplementing said lever for moving one side of the bead ring still farther from its seat.

11. A combination as defined in claim 10 in which the supplemental ring-moving means is associated with one of the push rods of the ring.

12. In apparatus of the character described, the combination of a pair of relatively movable mold sections, bead rings seated in the respective sections, push rods connected to one of said bead rings, means for moving said push rods in unison to move the bead ring a determinate distance from its seat, and means for moving one of the push rods independently of the other push rods to move one side of the ring farther from its seat.

13. In apparatus of the character described, the combination of a pair of annular relatively movable mold sections, bead rings seated in the respective sections, push rods connected to one of said bead rings, a rocker arm engaging said push rods to move the same in unison, means for rocking the rocker arm in timed relation to movement of the mold sections to move the bead ring from its seat, and supplemental means carried by the rocker arm for moving one of the push rods independently of the others to lift one side of the ring farther from its seat.

14. A combination as defined in claim 13 in which the supplemental ring-moving means is a fluid pressure cylinder.

15. A combination as defined in claim 13 in which the supplemental ring-moving means is a fluid pressure cylinder, and the associated push rod is the piston rod of said cylinder.

PETER DE MATTIA.